United States Patent [19]
Chao

[11] 4,367,067
[45] Jan. 4, 1983

[54] BALL CHAIN POSITIVE DRIVE STEPLESS TRANSMISSION

[76] Inventor: Yau-Shing Chao, No. 224, Chi-Lin Rd., Taipei, Taiwan

[21] Appl. No.: 175,958

[22] Filed: Aug. 7, 1980

[30] Foreign Application Priority Data

Aug. 10, 1979 [JP] Japan ................ 54-102345

[51] Int. Cl.³ .................. F16G 1/28; F16G 13/18
[52] U.S. Cl. .................. 474/154; 474/175; 474/203; 474/243
[58] Field of Search .................. 474/29–31, 474/154, 175, 203, 243, 167

[56] References Cited

U.S. PATENT DOCUMENTS

| 113,836 | 4/1871 | Bates | 474/175 |
| 1,601,662 | 9/1926 | Abbott | 474/29 |
| 2,073,846 | 3/1937 | Maurer | 474/243 |
| 2,096,431 | 10/1937 | Keller | 474/31 |
| 2,714,825 | 8/1955 | Ferrari | 474/29 |
| 2,852,953 | 9/1958 | Karig | 474/29 |

FOREIGN PATENT DOCUMENTS 2713589 10/1978 Fed. Rep. of Germany ...... 474/243

Primary Examiner—Lawrence J. Staab
Attorney, Agent, or Firm—Shoemaker and Mattare, Ltd.

[57] ABSTRACT

A ball chain positive drive stepless transmission comprising two V sheaves deployed on a pair of parallel shafts and an endless ball chain serving as transmission medium therebetween and characterized in, each sheave having a V shaped groove formed by two opposite bevel members with an undulating surface readily disposed thereon. Each link of the chain has a ball set adapted to be positively engaged with the undulating surface and also to enable the stepless change of speed while the unit is at rest.

6 Claims, 16 Drawing Figures

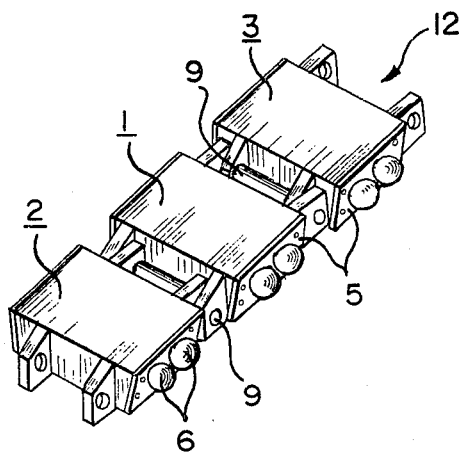
FIG. 1
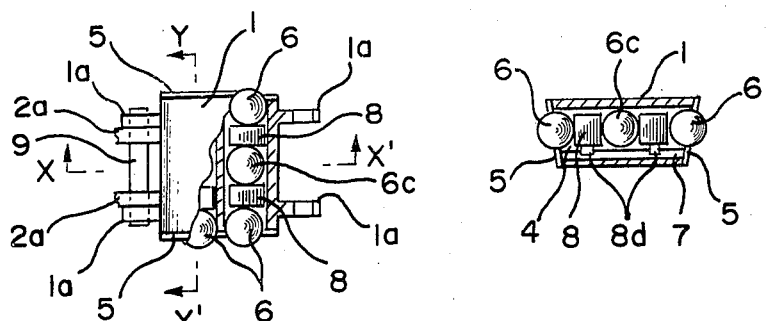
FIG. 2  FIG. 3
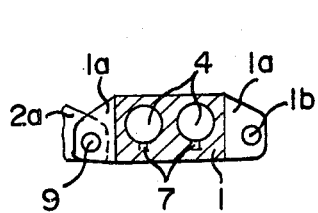 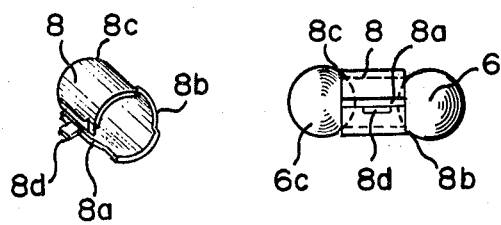
FIG. 4  FIG. 5  FIG. 6

BALL CHAIN POSITIVE DRIVE STEPLESS TRANSMISSION

FIELD OF THE INVENTION

The present invention relates generally to positive drive stepless transmissions and more particularly to a stepless speed transmission with ball chain serving as a transmission medium in positive engagement with the sheaves.

BACKGROUND OF THE INVENTION

In conventional stepless transmissions, an endless chain is disposed between a pair of V sheaves with grooves of variable width. In speed changing operations, it is usually easier to shift the chain towards the center of the sheave shaft. When the shift is towards the opposite direction, that is, away from the shaft center, it is much more difficult. Since the outward shift of the chain is indebted to the centrifugal force of the rotationary movement, the shift effects more slowly when the system is operating at a low speed, and becomes impossible when the system ceases motion.

SUMMARY OF THE INVENTION

Therefore the main object of the present invention is to provide a positive drive stepless transmission with a ball chain means having each a link provided with a ball set, wherein the balls are freely movable sidewisely but are firmly locked in place when forced inwardly sidewise. Thus, the balls are capable of engaging the undulating surface of the V groove of the sheaves to ensure a quick and positive drive shift under any speed situation even when the system is at rest.

Other objects and features of the present invention will become apparent from the following detailed description to be taken in conjunction with the annexed drawings.

BRIEF DESCRIPTION OF THE DRAWINGS

FIG. 1 is a perspective view of a section of the ball chain of the present invention;

FIG. 2 is a partially cut-away top view of one link of the ball chain;

FIG. 3 is a sectional view taken along the Y-Y' line of FIG. 2;

FIG. 4 is a sectional view taken along the X-X' line of FIG. 2;

FIG. 5 is a perspective view of a snap cylinder;

FIG. 6 is a bottom view of the snap cylinder in action, wherein the balls are in close pressing relation with the snap cylinders;

DETAILED DESCRIPTION OF INVENTION

Figure 7:
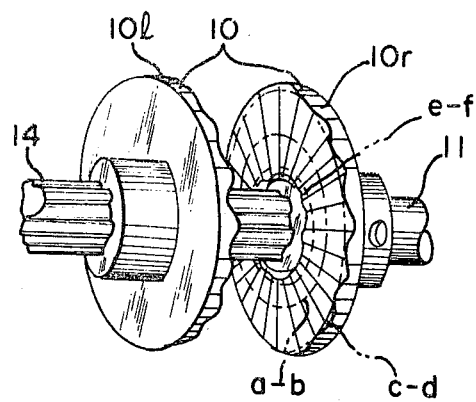
FIG. 7 is a perspective view of the V sheave with opposite undulating bevel members.

Now refer to FIG. 1 to FIG. 5 for a detailed description of the ball chain employed in the present invention.

FIG. 1 depicts a partial perspective of the ball chain 12 which is formed by a plurality of links in a row. All the links are identically constructed except that the spacing of the connector may be provided in a wider gauge such as shown in link 1 or a narrower gauge such as link 2. The links 1 and 2 are connected alternately with a connecting pin 9 which allows the links to revolve upon each other and prevents sidewise shifts along the pin due to its limited allowance. By connecting together the plurality of links and connecting the ends, an endless chain is thus formed. In case an odd member of links shall be required to form an endless chain, then a link 3 having one pair each of wider and narrower connectors shall have to be inserted between elements 1 and 2.

Details of the link 1 or 2 are shown in FIGS. 2 through FIG. 5. Each link has a casing 1 and two pairs of connectors 1a (2a) disposed at both the lower front and rear, equi-distance from both left and right sides. A pin hole 1b is disposed in each connector 1a, the links 1 and 2 are connected with a pin 9 through those holes 1b when connectors 2a of one link are closely engaged with the connector 1a of an adjacent link, so that the two links may rotate about each other without sidewards movement.

Figures 8, 9:
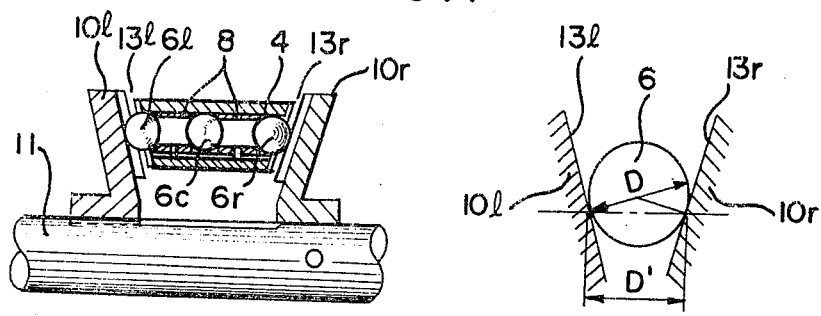
FIG. 8 is a radial partial section of the sheave in operation with the ball chain in a groove, corresponding to a sectional view taken along the I-I' line in FIG. 10.
FIG. 9 is an illustration showing the closing of the opposite sheave members along a shaft in which a ball is engaged between the two undulating surface.

FIG. 3 depicts a cross section of links 1 or 2 where the casing is shaped like an inverted trapezoid which matches with the tapered grooves of the V sheaves as referred to later in FIG. 8. Referring also to FIG. 4, the casing 1 is provided with a pair of parallel tunnels 4 passing laterally through the link with each tunnel having thereunder a key way 7. Contained within the tunnel 4, are balls 6,6c, 6 of identical diameter, as shown in FIGS. 2 and 3.

In FIGS. 5 and 6, the details of a snap cylinder 8 are shown. A longitudinal split 8a is disposed along the cylindrical wall and the outside diameter of the snap cylinder 8 is identical to that of the balls 6, 6c. One end 8c of the snap cylinder 8 is vertically clean-cut while the other end 8b is modified to be like a mouth having lips projecting at the left and right sides. In the middle of the split 8a, a tongue 8d is provided. Into the tunnel 4, balls and the snap cylinder are arranged in the sequence of: ball 6, cylinder 8, ball 6c, cylinder 8, and finally ball 6. Then each end of tunnel 4 is closed with a side plate 5, the side plate 5 having a pair of holes, each with a diameter slightly less than the ball diameter, and said pair of holes being aligned (communicatable) with the tunnels 4, so that the balls retained in the tunnels are capable of protruding out of the plate hole less than half their surface. The diameter of each of the tunnels 4 is slightly bigger than that of the balls or the snap cylinders, such that, when the series of balls and cylinders retained therein is pushed by an external force from one side along a lateral direction, the series is allowed to move axially within the tunnel yet is confined therein by the two side plates 5. When the squeezing forces are effected from both sides at the same time, the balls 6 and 6c at both sides tend to press the ends of the snap cylinder 8 to cause the split 8a to open and the cylinder wall to press tightly against the wall of the tunnel 4 to catch the series of ball-cylinder-ball therein. Then the series is held firmly as if it were joined into one solid piece with the chain link casing 1. As soon as the squeezing force is removed, the snap cylinder 8 resumes its original shape and is released from the tunnel wall and the ball-cylinder series is again capable of moving freely within the two side plates 5—5.

Dimensions of the balls 6, 6c, snap cylinder 8 and the inside diameter of the tunnel 4 must be strictly uniform to ensure precision and exchangeability; the overall length of all ball-cylinder series under compression must be uniform. Tongue 8d must always be loosely inserted in the key way 7 under the tunnel 4 so that the snap cylinder 8 can slide freely along the tunnel 4 but cannot rotate therein; the mouth-like end 8b of the snap cylinder 8 will thus always be perpendicular to the chain, and the balls 6 retained in the tunnel 4 will resemble those a ball with bearing, being able to rotate in a direction perpendicular to the chain but not horizontally along the chain. The ball 6c is engaged with the two clear cut ends 8c of two cylinder 8, in the middle of a series composed of ball 6—cylinder 8—ball 6c—cylinder 8—ball 6; when the series is compressed, ball 6c will produce a wedge effect towards clear cut ends of cylinders 8c and force the cylinder wall to be fully in contact with the tunnel wall.

As for the structure of chain link 2, it is entirely the same as that of link 1 except for the span or gauge of the connector pairs.

By connecting alternately links 1 and 2 with pin (and if necessary a link 3 may be inserted) an endless chain for the use in the present invention is formed.

In FIG. 7, the V sheave of the present invention is illustrated. The sheave 10 comprises a pair of beveled halves 10r and 10l which resembles those usually used in ordinary chain type stepless transmission; however, the undulating surface construction is a special feature of the present invention.

Figures 10, 11:
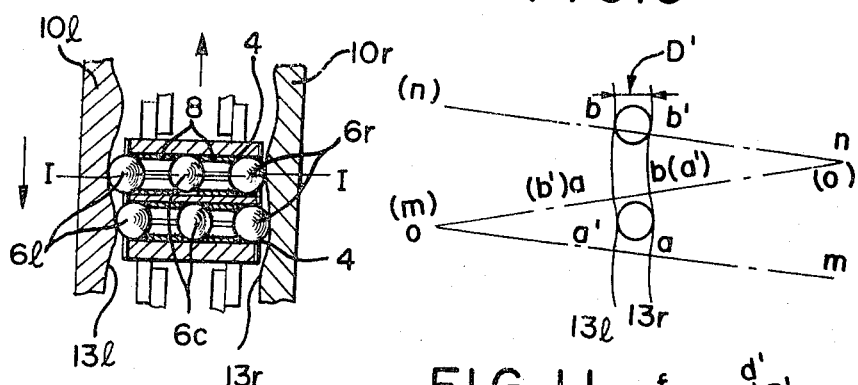
FIG. 10 is an extended sectional view of the sheave with the chain link engaged thereon cut along the cylindrical surface parallel to the shaft showing a link of the ball chain in operation.
FIG. 11 is a diagram showing the relative position of the two undulated surfaces being moved close to a distance of a ball diameter, or D' in FIG. 9.
Figure 12:
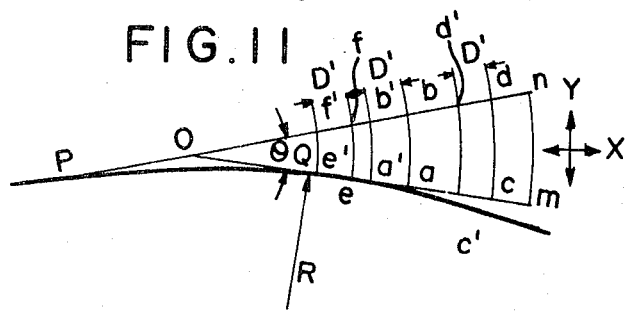
FIG. 12 is an illustration of the principle of the forming of the curve of undulated surface used in this invention.

As shown in FIG. 7, assuming that the right half 10r of the V sheave 10 is fixed to a shaft 11, let the left half 10l be slidably mounted face to face to the right half 10r on the splined portion 14 of the same shaft 11. Cut the halves 10r—10l along the circle where the chain is hung to get a cylinder coaxial with the shaft, then let the section of said cylinder be extended like the plane in FIG. 10 wherein a pair of curves of undulations is shown. Let the two curves come closer to a distance D' such as shown in FIG. 9 the two curves 13l and 13r in, FIG. 10 becomes FIG. 11 as illustrated. In FIG. 11 the portions a'-(b')a-b, a-b(a')-b' corresponding to one pitch on the two undulating curves are constituted by the involutes a'-b' and a-b, a-b and a'-b' shown in FIG. 12, respectively. In FIG. 12, a-b and a'-b', c-d and c'-d', e'-f' are pairs of the involutes of a base circle with a considerably large radius R, and each pair of involutes has a distance of D', i.e., for example, the involute a-b always has a radius of curvature bigger than that of the involute a'-b' by D' at any corresponding point of them. In FIG. 11, the curve 13l is formed by connecting the involute a'-b' with the inverted involute a-b taken from FIG. 12 and to align the directions of the radii of curvature to keep 180 degrees at the point of connection, and the curve 13r is formed in the same manner by connecting the involute a-b with the inverted a'-b'. It is to be noted that the relative position of the curves a-b and a'-b' between the curves 13l and 13r of FIG. 11 is still the copy of that in FIG. 12, and uni-distance D' is kept at any point between the curves 13l and 13r in FIG. 11. From FIG. 9, it is clear that the distance D' is the diameter of the horizontal section of ball 6 where ball 6 is in contact with curves 13l and 13r. For the above-mentioned reasons, the ball 6 would be always in contact with both curves 13l and 13r at the same height when the ball is put on at any place between the curves 13l and 13r in FIG. 11. Following the same principle, it will be understood from FIG. 10 that the pairs of balls 6l and 6r will constantly be in contact with curves 13l and 13r.

Curves of FIG. 12 depict those on the middle circle of sheave halves 10l and 10r such as a-b in FIG. 7. In FIG. 12, let the intersection of the two tangent lines Om and Pn be 0, then the involute c-d and c'-d', e-f and e'-f' on the same base circle R within an angle ∠nOm become the sections of undulations on the outermost circle c-d and innermost circle e-f in FIG. 7.

Assuming the angle $\angle nOm = \theta$, and let $c0-d0=e0-f0=\Delta$, since $ec=fd$, then $\Delta = R(2 \tan \theta/2 - \theta)$, and since R is fixed, $\Delta$ is determined by $\theta$. In other words, the difference between the distance from the point of intersection of an involute with Om to 0 and the distance from the point of intersection of the same involute with On to 0 is constant. In FIG. 12, take point 0 as the apex of a cone, then Omn (Om = On) denotes a top view of a sector on the cone surface, let the numerous curve sections on the involutes between cd to ef or c'd' to e'f', with respective ends of which such as d, b, f to revolve ±90° about the Y axis, sector shaped concave or convex surfaces are formed; these concave and convex sectors are corresponding to the component sectors of the undulating surfaces of the sheave halves 10l and 10r as shown in FIG. 7. As abovementioned, the directions of radius of curvature on the same phase of undulating curve being the same, and a difference in distances from two point on the same circle of the undulating cone surface such as point a and b on curve a-b, to the intersection point 0 of tangents Om and On is determined by the magnitude of angle $\theta$, i.e. 0e−0f= 0a−0b=0c−0d. Therefore the depth of the undulation, in spite of the radius of the circle, is identical throughout the same phase. In other words, cutting the sheave face with a plan to include the axle, the outline is in parallel with the outline of the original outline of the unworked cone. That is, just as shown in FIG. 8. The two sheave halves 10l and 10r with above-mentioned undulating surfaces 13l and 13r are hence disposed face to face the relationship shown in FIG. 11.

The function of the transmission with chain 12 and the pair of sheaves is now detailed through FIGS. 8, 9, 10, 13 and 14.

Figure 13:
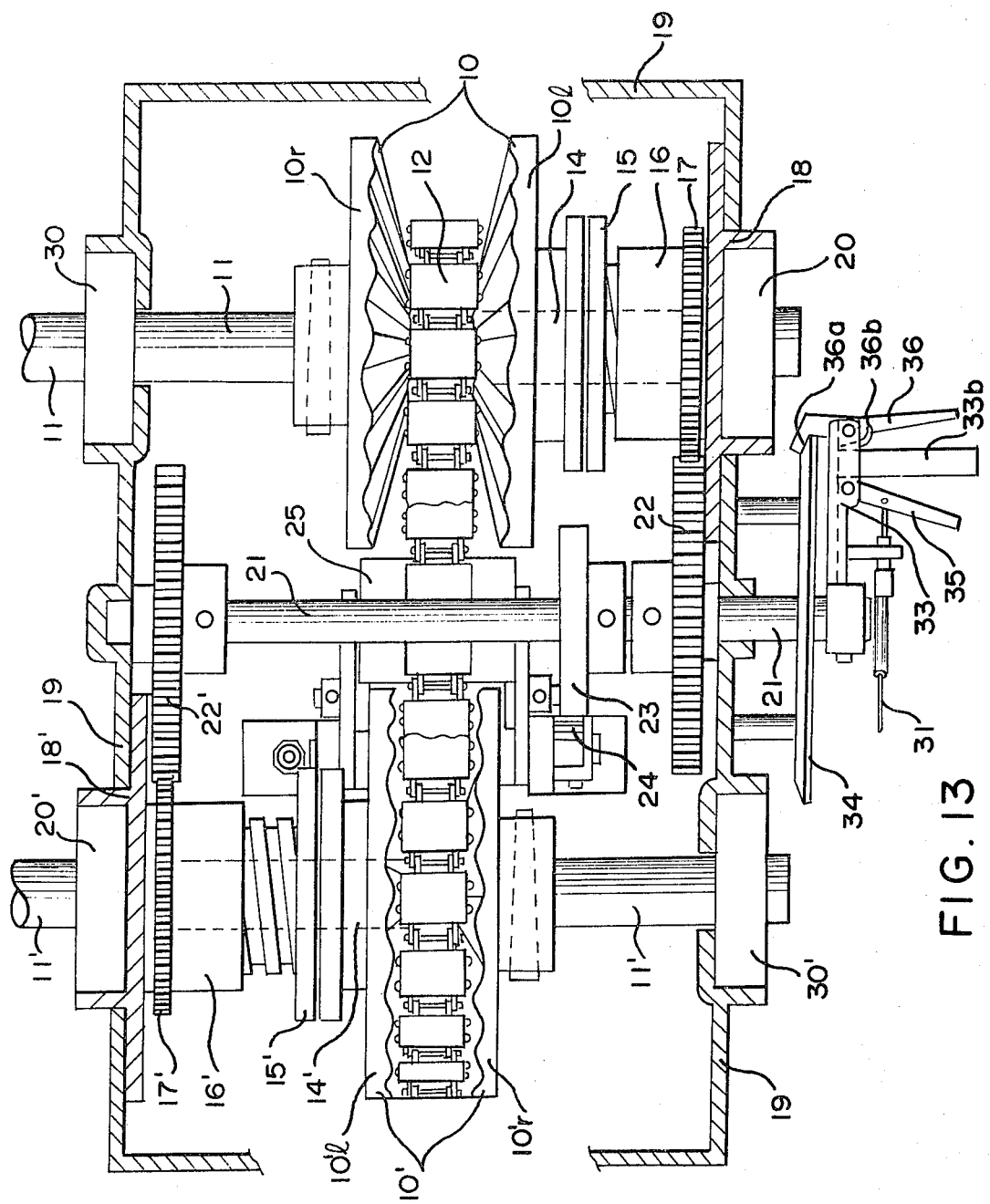
FIG. 13 is a top view of a preferred embodiment of the stepless transmission of the present invention.
Figure 14:
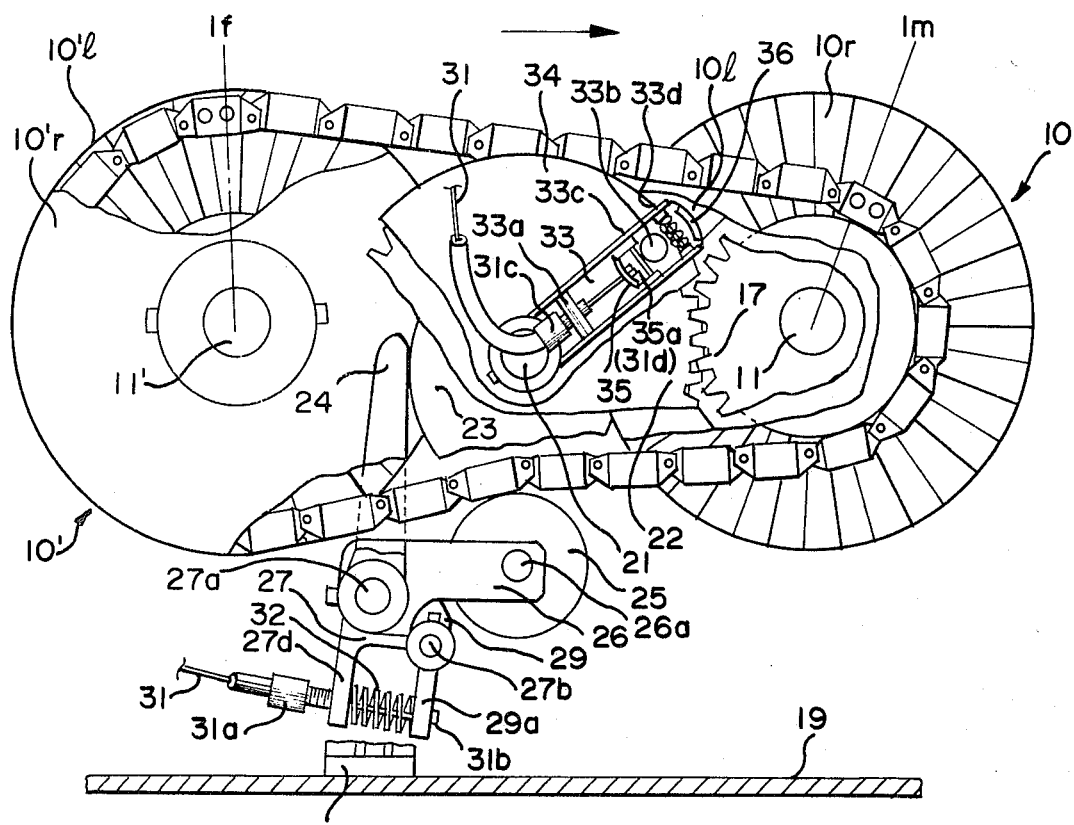
FIG. 14 is a side view of the same embodiment as FIG. 13.

Suspend the chain 12 on to the grooves of V sheaves, the balls in the links are guided by the undulating surface of the sheaves to move within the tunnel 4. Since the balls are designed to project out of the casing a little more than the maximum depth of undulating surface, they easily keep in close contact with the undulating surface, such as depicted in FIG. 8 and FIG. 10. In FIG. 8, balls 6l and 6r are engaged with the undulating surface 13*l* and 13*r* of sheave halves 10*l* and 10*r* in the same manner as that shown in FIG. 10 wherein the balls are engaged between the walls of the halves 10*l* and 10*r*. The ball-cylinder series is thus sandwiched between the undulating surfaces of the sheave halves, receiving the driving force from the sheave 10 and the loading force from the sheave 10', as shown in FIGS. 13 and 14 when the ball chain 12 tightened therebetween. A wedge effect is formed due to the component force thereof towards the inclined surfaces of the sheave halves. Since the balls 6 are allowed only a vertical revolution but not a horizontal revolution, referring to FIGS. 5 and 6, FIG. 8 and FIG. 10, and comparing the contact area, contacting pressure, rotating tongue and frictions between the ball 6, snap cylinder 8, ball 6 and undulating surface 13*l* and 13*r*, it can be seen that the chain is wedged into the clearance between the sheave halves and the series 6-8-6*c*-8-6 tends to be compressed towards its center and the two snap cylinders are forced to open and catch against the inner wall of tunnel 4. At the same time, the links of the chain elements are well aligned, the two rows of the ball series bite into the sheave halves as shown in FIGS. 10 and 13 to execute a positive drive. The positive nature of the drive is further assured by the inclined contact between the ball and the undulating surfaces of the sheaves, and driving force is produced upon the concave surface, and the inclination angle increases with the direction of slipage. The transmission, when a double row of ball-snap cylinder series is applied, much enhances the action of the torque, as shown in FIG. 10.

The abovementioned effect is true for both the drive side and the driven or load side. In FIG. 10, the driving sheave is shown downward, the driven sheave moving in the opposite direction, while the direction of the chain remains unchanged. Yet the curve direction varies from driving to driven sheaves. FIG. 13 depicts both driving and driven sheaves.

Now refer to FIG. 13 to FIG. 16, wherein a preferred embodiment of the transmission of the present invention using the chain 12 and sheaves 10 is shown and the function of the positive and quick shift transmission is illustrated. As the basic principle is the same as conventional sheave-chain drives, it shall not be related further, and the characteristic features of the present invention will be stressed.

FIG. 13 is a top view showing the ball chain 12, driving sheave 10, driven sheave 10' and other auxiliaries constituting the positive transmission of the present invention. FIG. 14 is a side view of the same with stationary sheave halves 10*r* and 10'*r* respectively fixed on driving shaft 11 and driven shaft 11' which are disposed in parallel yet in opposite directions and rotatably on the housing 19 of the transmission. Movable sheave halves 10*l* and 10'*l* are slidably and respectively mounted on the splined portions 14 and 14' of shafts 11 and 11'. The hubs at the back of sheave halves 10*l* and 10*l*' are supported on threaded cylinders 16 and 16' through thrust bearings 15 and 15' and faces inward. Said cylinders 16 and 16' with housings 18 and 18' for bearings 20 and 20' supporting the driving and driven shafts are integrally formed and fixed on the side walls of the housing 19. The other ends of shafts 11 and 11' are supported through bearings 30 and 30' on the opposite side wall of the housing 19. Outside the threaded cylinders 16 and 16', gears 17 and 17' are provided. An operation shaft 21 is disposed equi-distant between and parallel to shafts 11 and 11', the ends of said shaft being rotatably supported on the walls of housing 19 with one end projecting out of the housing.

A pair of gears 22 and 22' of identical dimension are disposed on the shaft 21 just inside the opposite housing walls to mesh with gears 17 and 17' respectively on cylinders 16 and 16'. All the components on shafts 11 and 11' are of the same dimension and arranged in the same order except in reverse direction. In FIG. 13, let the operation shaft 21 revolve in a certain direction, cylinders 16 and 16' would revolve through gear mesh 22-17 and 22'-17' in an opposite direction with the same amount of movement to press tight or to loosen the corresponding movable sheave halves. In other words, through the operation of shaft 21, the chain grooves of the V sheaves 10 and 10' are respectively widened or narrowed in the same amount and the centers of the grooves are always on alignment, as clearly shown in FIG. 13. With appropriate tension, a ball chain 12 of the present invention is suspended on sheaves 10 and 10', with a conventional tightener being used to adjust the tension of the chain.

Figures 15, 16:
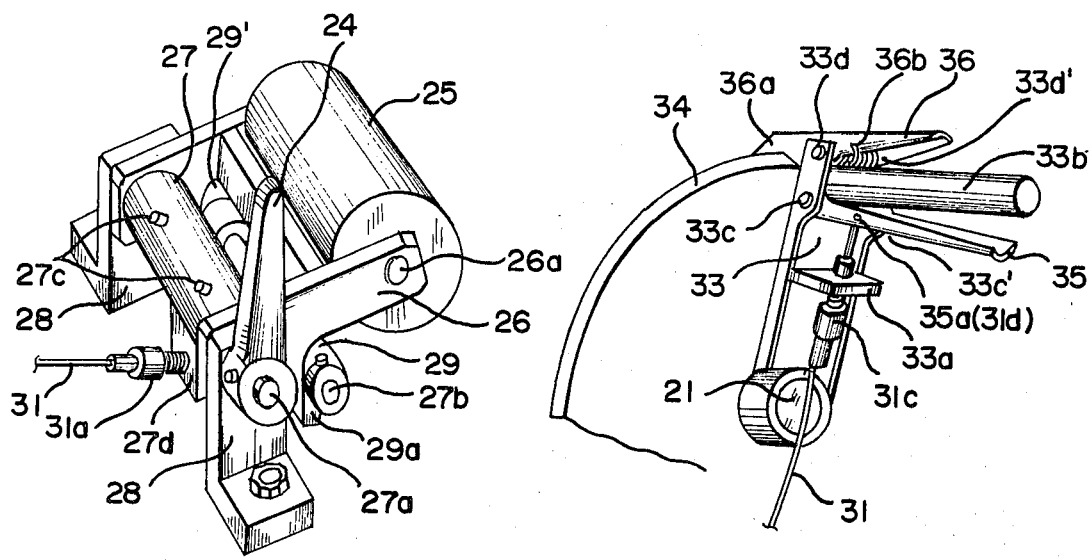
FIG. 15 is a perspective view of a chain tightener.
FIG. 16 is a perspective view of the shifting lever.

From both FIG. 15 and FIG. 16, it can be seen that a chain tightening roller 25 is rotatably mounted on the front ends of a H-shaped bracket 26 through a shaft 26*a*. The rear end of the H-shaped bracket is rotatably mounted on the ends of a pivot shaft 27*a* on a supporting plate 27 through bearing holes, then the H-shaped bracket 26 is pivoted freely with supporting plate 27 being a firm plate with pivot shaft 27*a* provided at its rear end, pivot shaft 27*a* being fixed with pins 27*c* and the projected ends of pivot shaft 27*a* being rotatably mounted on a pair of bearing seats 28 and 28. A cam follower 24 is fixed on one end of the pivot shaft 27*a*, the supporting plate 27 and the cam follower 24 are integrally formed and freely rotatable on bearing seat 28. At the front end of the supporting plate 27 there are a pair of ears with a rotatable pin 27*b* passing through. At the ends of pin 27*b*, a pair of semi-oval supporting pieces 29 and 29' are fixed. At the rear portion of the supporting plate 27 an ear 27*d* is disposed whereon a terminal 31*a* for the operation wire socket is provided. Ear 27*d* is opposite to another ear 29*a* projected downward from the front supporting piece 29 with a spring 32 such as shown provided between the ears 27*d* and 29*a*. One end 31*b* of the operation wire 31 is fixed to one ear 29*a*, and led out through the socket 31*a* with the other end of the wire connected to the auxiliary lever 35 of an operation handle 33*b* which is to be related later. In such a way, the H-shaped bracket 26 of the tightening roller 25 is evenly supported on the pair of supporting pieces 29 and 29', through the pulling of the wire 31, the tightening roller 25 is liable to descend in response to moving of pieces 29 and 29' and the rotating of the H-shaped bracket 26. Spring 32 resumes the position of tightening roller 25. Cam follower 24 is in contact with a cam 23 mounted on the operation shaft 21 and moves with the cam 23 to cause the lifting and lowering of the supporting plate 27 thereby the roller 25 is forced to press or release from the roller chain 12 to adjust the difference in tension due to the shifting of the transmission, this action being automatic without the pulling of the operation wire.

The shifting lever 33 is now detailed by way of FIG. 16, said lever 33 is fixed on the projected end of operation shaft 21 and is rotatable along a disc 34 mounted on the housing 19. Upon the shifting lever 33 a plate 33*a* is fixed to carry another wire socket terminal 31*c*. On the end of lever 33 and at the inner base side of a handle 33*b*, an auxiliary lever 35 is rotatably mounted to a pair of ears 33c–33c' which serves as a pivot point. A second end 31d of the wire 31 is fixed on the auxiliary lever at a position 35a adjacent to the pivot point. When the auxiliary lever 35 is squeezed towards the handle 33b, wire 31 is pulled. A positioning lever 36 is pivotally mounted to a pair of ears 33d–33d' provided on the outer end of the shifting lever 33 adjacent to the outer side of the handle 33b. A spring 36b is provided around the pivot pin to exert pressure on lever 36 to cause the front end 36a of the lever 36 to constantly engage with the circumference of the disc 34 to prevent the handle 33 from sliding when it is not in operation.

Now refer to FIG. 13 through FIG. 16 for an illustration of the quick and easy operation of the ball chain stepless transmission of the present invention. In a situation such as shown in FIG. 13, the driving sheave 10 has the wider groove, the driven sheave 10' the narrower groove, and the transmission is in rest. Operation lever 33 is released from the above-said situation by squeezing together the auxiliary lever 35 and the positioning lever 36 against the handle 33b. Simultaneously, the pulling of the wire causing the revolving of support pieces 29–29' whereby the tightening roller is lowered to release tension on the ball chain 12, and each ball-snap cylinder series within casing 1 and 2 is loosened to release the catch of the snap cylinder 8 against the inner wall of the tunnel 4.

Grip tightly the handle 33b and turn clockwise, gears 22-22' cause the moving of gears 17 and 17' which in turn rototate threaded cylinder 16 to push inward the sheave half 10l to decrease the width of the groove on V sheave 10, and the chain 12 suspended therein floats outwards easily through the vertical revolving of the balls. In the meantime, the threaded cylinder 16' on the driven sheave 10l' slide retracts in the same speed, chain 12 suspended thereon sinks inwards into the widening groove. The shift of the transmission is thus accomplished easily even when the transmission is at rest. By releasing the lever 33, the chain 12 resumes the original tension, the threaded cylinders 16-16' are fixed, and the transmission between sheaves 10 and 10' is maintained. The above gives a full explanation of how the instantaneous completion of shift of speed is possible during a rest situation.

Accompanying the revolving of the operation shaft 21, the cam 23 rotates accordingly, the tightening roller 25 supported by the cam follower 24 keeps a proper tension on the chain 12. When the system is running at a low speed, the shift may be made in the same manner as when the system is at rest. When the system is running at a high speed, the shift of transmission is easier even without applying the auxiliary lever 35 to release the tension of the chain 12. The transmission of the present invention has proven to be much quicker and easier than conventional ones now in use and the advantages of the ball chain of the present design are credited for the improvements.

As shown in FIG. 14, the chain links sink inwards into the groove of driving sheave 10 or float outwards upon the groove of driven sheave 10', such as 1m and 1f. During the running conditions the section of the chain between these two points is under constant tension and takes the toughest job due to the driving force and load exerted. When releasing tightening roller 25 upon shifting of the transmission, since forces are still exerted at these two points, the snap cylinders within these chain links are kept sticking to the inner wall of the corresponding tunnels, causing the ball-snap cylinder series 1m to be compressed from both sides with the narrowing of the groove, and making the balls 6 at both sides rotate and float outwards along the radial direction on the contact surface of the undulation on the driving sheave 10; ball series 1f, in the meantime, tends to be wedged inwardly by the component force directed towards the contraradial direction by the tension of the chain with the widening groove of the driven sheave 10' and sinks towards the undulation surface towards the shaft. Since the angle of inclination of the undulating surface of the sheaves is the same as that of the original coaxial cone surface before working, the abovesaid function effects otherwise, since the chain is kept aligned at all times, the chain will not be able to float outwards or sink inwards along the inclined undulation of the sheaves with the chain link whereof the ball-snap cylinder series are still sticking in the tunnel. During shift operation, at least 1m and 1f are still in meshing engagement with the undulating surface of the sheave so no slippage can occur.

As mentioned above, the transmission of the present invention possesses not only the positive drive function owned by the conventional stepless transmission devices, but is also capable of performing transmission shifts when the system is at rest. During low speed running, quick and smooth shifts can also be effected. Therefore it provides an ideal and versatile transmission means.

In this invention, the ball chain used in an endless linkage of links, each having a single or double lateral tunnel, within which a series of ball-snap cylinder-ball (b-s-b) or b-s-b-s-b is retained. The transmission surface of the V sheave has a undulating surface spread in lateral involute, and the undulation on the same phase position being of the same depth and height despite the variation in radius. The transmission thus formed by suspending said ball chain in the grooves of the V sheaves, a positive drive stepless shift is featured and is characterized in quick and smooth operation during low speed running or even a rest situation.

In the above embodiment, a double row of ball series is indicated. A single series would also give a proper performance.

It is possible to adapt a double-deck arrangement of ball series by making the casing of the link short and thick; the upper deck ball series may have the larger balls and longer overall series length than the lower deck ball series, if necessary, to cope with the different width of the sheave groove.

Furthermore, the connecting pin may be enlarged to form a tunnel and a ball series may be inserted therein. Again, the undulation is a laterally extending involute; therefore in a same phase situation, no matter what the radial position, the depth of the undulation would be the same, to insure a positive drive at any speed ratio.

The above embodiment serves only for illustration and not for restriction. Any modification that would be evident to those skilled in the art should be considered as within the scope of the attached claims.

I claim:

1. A ball chain positive drive stepless transmission comprising:
    a pair of V sheaves each having two bevel wheels deployed oppositely on a shaft and each bevel wheel having an undulating surface with the peaks thereof radially disposed at an angle to the axis thereof;

an endless ball chain comprising a plurality of links each having at least one tunnel formed transversely of the link, and a plurality of balls rotatably inserted in said tunnel with a snap cylinder in between adjacent balls and having the ends thereof in contact with the balls located adjacent to the ends of the snap cylinder, said plurality of balls including an end ball located on each side of the link and partially protruding outwardly from the link tunnel, each snap cylinder being flexible and having a relaxed configuration in which the outer diameter of the relaxed snap cylinder is less than the inner diameter of the tunnel so that movement of the balls within the tunnel is permitted, each snap cylinder being split longitudinally thereof to form means for effecting radially outward expansion of the cylinder when both of the balls located adjacent to the snap cylinder ends are forced against those cylinder ends, said radially outward expansion of the snap cylinder causing said cylinder to lock itself against the inner wall of said tunnel and thus to firmly hold the balls located adjacent thereto, said flexible cylinder being biased into said relaxed configuration so that the cylinder disengages from the tunnel inner wall and releases the balls when force is removed from the cylinder, the links in said plurality of links being pivotally connected to each other;

said pair of V sheaves being disposed on a parallel pair of shafts to be connected to a suitable driving and driven device, and said endless ball chain being suspended around said V sheaves with said balls at both sides of the links in meshing engagement with said undulating surfaces.

2. The ball chain positive drive stepless transmission according to claim 1, wherein said plurality of links are pivotally connected to each other and are capable of vertically pivoting with respect to each other and being aligned in a straight line to form an endless chain.

3. The ball chain positive drive stepless transmission according to claim 1, wherein said undulating surface comprises a plurality of pairs of concave surface sectors and convex surface sectors, each concave surface sector and convex surface sector including involute curves, the undulations of said undulating surface having a constant height at any radial position on the undulating surface of said bevel wheel.

4. The ball chain positive drive stepless transmission according to claim 1 wherein each snap cylinder includes a smooth end and a jagged end.

5. The ball chain positive drive stepless transmission according to claim 1 wherein each snap cylinder further includes a key thereon and each tunnel has a keyway defined therein for receiving said snap cylinder key.

6. The ball chain positive drive stepless transmission according to claim 1 wherein each snap cylinder has an outer diameter essentially equal to the diameter of each of said balls.

* * * * *